United States Patent [19]

Munroe et al.

[11] Patent Number: 4,735,577

[45] Date of Patent: Apr. 5, 1988

[54] EXTRUDED OUTLET STRIP

[75] Inventors: Ronald G. Munroe, Georgetown, S.C.; Jonathan R. Lax, Philadelphia, Pa.

[73] Assignee: SL Industries, Inc., Marlton, N.J.

[21] Appl. No.: 39,769

[22] Filed: Apr. 14, 1987

Related U.S. Application Data

[63] Continuation of Ser. No. 298,518, Sep. 1, 1981, abandoned.

[51] Int. Cl.[4] .................................... H02G 5/00

[52] U.S. Cl. .................................... 439/113; 439/212

[58] Field of Search ............... 439/110, 113, 119, 120, 439/121, 211, 212, 216; 174/57, 68 C

[56] References Cited

U.S. PATENT DOCUMENTS

D. 151,571 10/1948 Tillinghast .................. 339/38 X
2,351,631 6/1944 O'Brien .................. 439/113
2,384,487 9/1945 O'Brien .................. 439/216 X
3,061,810 10/1962 Boyd .................. 339/22 R

FOREIGN PATENT DOCUMENTS 1930515 2/1971 Fed. Rep. of Germany .... 339/22 B

*Primary Examiner*—Eugene F. Desmond
*Attorney, Agent, or Firm*—Cushman, Darby & Cushman

[57] ABSTRACT

A multiple electrical outlet strip is made in a simple inexpensive manner, yet the device produced has enhanced mechanical and electrical properties. A housing is extruded from plastic, and includes elongated electrically conductive material-receiving interior channels. A plurality of sets of spaced through-extending openings are formed in the housing top surface adjacent the electrically conductive material-receiving interior channels, the openings for receipt of male electrical plug prongs. Elongated spring brass contact strips are inserted the electrically conductive material-receiving interior into channels, and the strips are electrically interconnected to a cord which extends exteriorly of the housing. A bottom cover which comprises a plastic extrusion is slid into covering relationship with the housing bottom, and end plates are mounted with the housing to cover its open ends.

3 Claims, 3 Drawing Sheets

EXTRUDED OUTLET STRIP

This is a continuation of application Ser. No. 298,518, filed Sept. 1, 1981, which was abandoned upon the filing hereof.

BACKGROUND AND SUMMARY OF THE INVENTION

Multiple electrical outlet strips are very useful devices for facilitating the operation of multiple electrically powered components at a single location. Conventional multiple electrical outlet strips, such as shown in U.S. Pats. Nos. 2,743,423 and 4,113,334, usually comprise a metal casing having a plurality of outlet receptacles received by openings in one face of the casing, and connected together internally by a number of wires. Normally the outlet receptacles are integral components with their own terminals for receipt of male electrical plug prongs, with the outlet receptacles electrically interconnected by conventional wiring. Proposals have been made (see copending application Ser. No. 190,050 filed Sept. 23, 1980) for allowing the common wiring to provide the electrical contacts for the outlet receptacles, with the receptacles mounted within the casing in basically the same manner. Conventional housings for multiple electrical outlet strips are usually provided by pre-sized cans, or metal extrusions.

While conventional multiple electrical outlet strips perform their intended functions well, the costs of construction thereof are higher than desirable. The utilization of outlet receptacles requires that the receptacles be wired to each other and to the power source, and high labor costs are often associated therewith for the wiring of the receptacles together and the insertion of the receptacles into the casing. Additionally, the provision of the multiple receptacles provides relatively high component costs, and minimizes the flexibility of forming multiple electrical outlet strips of varying numbers of plug positions.

According to the present invention a multiple electrical outlet strip, and method of production thereof, are provided that result in the extremely inexpensive construction thereof. An outlet strip according to the invention is produced with a minimum of tooling costs as well as a minimum of labor costs, yet the outlet strip according to the invention has even better mechanical and electrical properties than conventional multiple electrical outlet strips. Once the length of the strip has been established, the cost will be the same irrespective of how many outlets it has since individual outlet receptacles are not utilized.

According to the present invention a multiple electrical outlet strip is produced by extruding an elongated housing from electrically insulating material (preferably plastic). The housing extrusion has at least a top surface and side walls, and includes elongated electrically conductive material-receiving interior channels. The elongated housing extrusion is severed to provide a housing of a predetermined length having opposite open ends, and a plurality of spaced through-extending openings are formed in the housing top surface adjacent the electrically conductive material-receiving interior channels. The openings comprise at least two spaced sets of spaced openings for receipt of male electrical plug prongs. Electrically conductive material, such as brass strips with locking portions, is inserted into operative association with each of the electrically conductive material-receiving interior channels, the locking portions maintaining the strips in place within the housing. The brass strips are electrically interconnected to an electricity conducting element, such as a conventional electrical cord, which extends exteriorly of the housing. Wire sections from the stripped end of an electrical cord may be brought into contact with the brass strips to effect this interconnection. End covers are then connected to the open ends of the housing, providing a complete multiple electrical outlet strip.

Preferably the extruding of the housing is accomplished by extruding a channel-shaped housing having an open bottom, and a bottom member adapted to cooperate with the open bottom of the housing is also extruded. Preferably interlocking portions on the housing and bottom are extruded and the bottom, once cut to the appropriate length, is slid into operative association with the housing, and can be held in place by the end covers. A plurality of self-tapping screw-receiving channels are preferably extruded in the interior of the housing and the end covers are connected to the open ends of the housing by passing self-tapping screws through each of the end caps into operative association with the screw-receiving channels which have been extruded.

In order to provide guidance of male plugs into the openings formed in the housing top surface therefor, upwardly-opening guide channels are extruded in the exterior of the top surface of the housing, and the openings are formed within the guide channels. Cover-receiving surface manifestations also are desirably extruded in the housing, and a cover of electrical insulating material having surface manifestations cooperating with the housing surface manifestations is preferably extruded and moved into operative association with the housing to cover any desired number of male electrical plug prong-receiving openings in the top of the housing.

The same extrusion profile is used for both the back cover and the top ind. outlet slideing covers.

It is the primary object of the present invention to provide an inexpensively constructed improved multiple electrical outlet strip. This and other objects of the invention will become clear from the detailed description of the drawings, and from the appended claims.

DETAILED DESCRIPTION OF THE DRAWINGS

Figure 1:
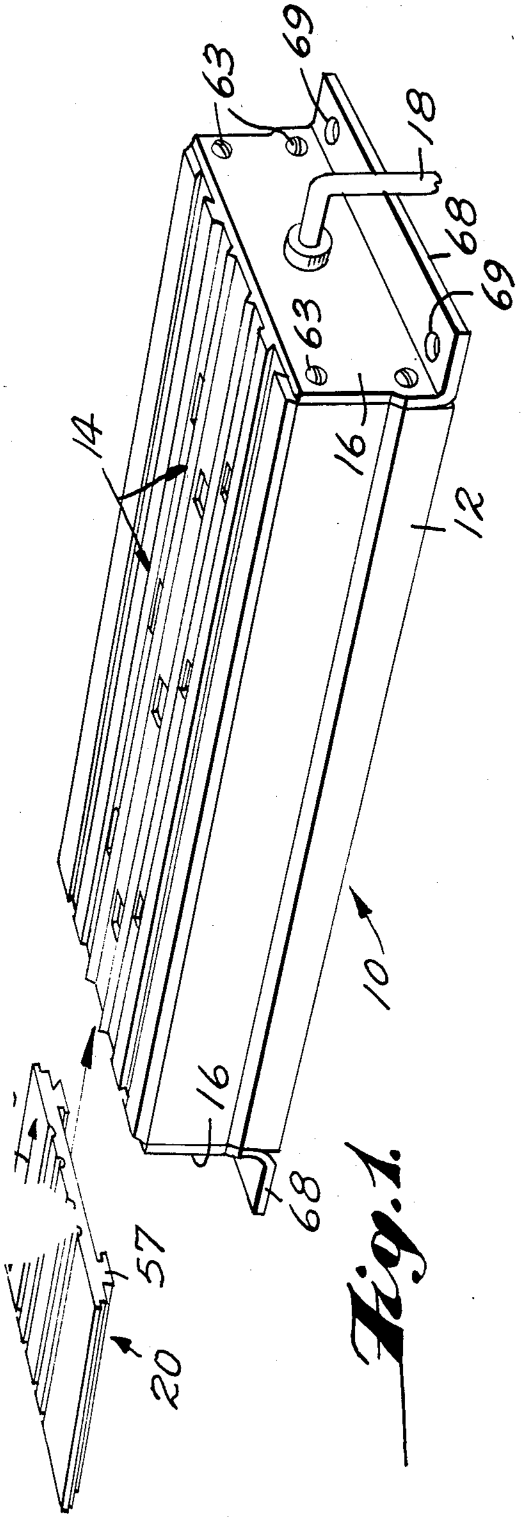
FIG. 1 is a perspective view of one form of a completed multiple electrical outlet strip according to the present invention.
Figure 5:
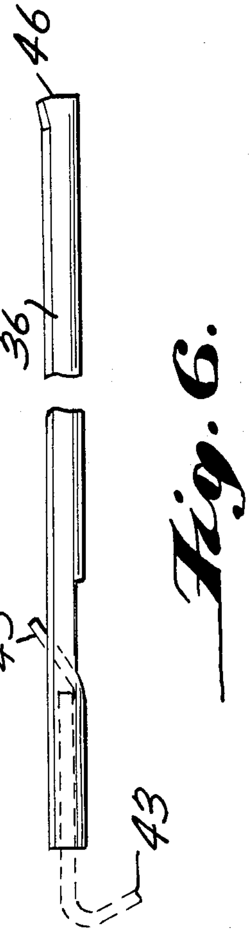
FIG. 5 is a side view of an exemplary electrical contact strip utilizable in the housing of FIG. 2.
Figure 6:
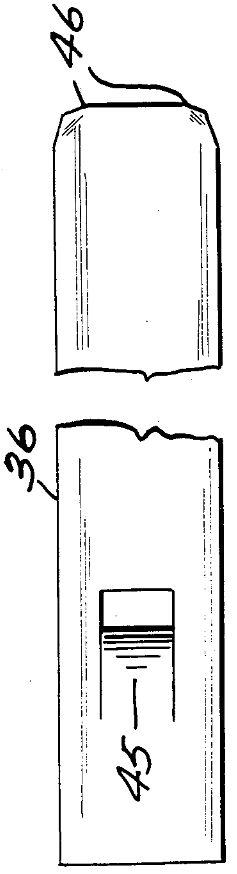
FIG. 6 is a top plan view of the strip of FIG. 5.
Figure 7:
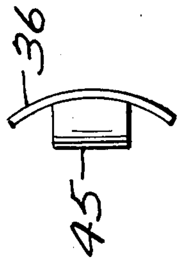
FIG. 7 is an end view of the strip of FIG. 5.

An exemplary multiple electrical outlet strip according to the present invention is shown generally at 10 in FIG. 1. The outlet strip 10 includes an extruded housing 12 of electrically insulating material (e.g. plastic), having a plurality of spaced through-extending openings, indicated generally at 14, formed in the top surface thereof, and having end plates 16 covering the open ends of the extrusion 12. An electrical cord 18 extends from the interior of the housing 12 to electrically interconnect all of the conductors associated with the openings 14 to a power source, and a cover 20 may be provided for cooperating with the top surface of housing 12 to cover one or more sets of openings 14. Cover cut from the same extrusion as the back cover.

Figure 2:
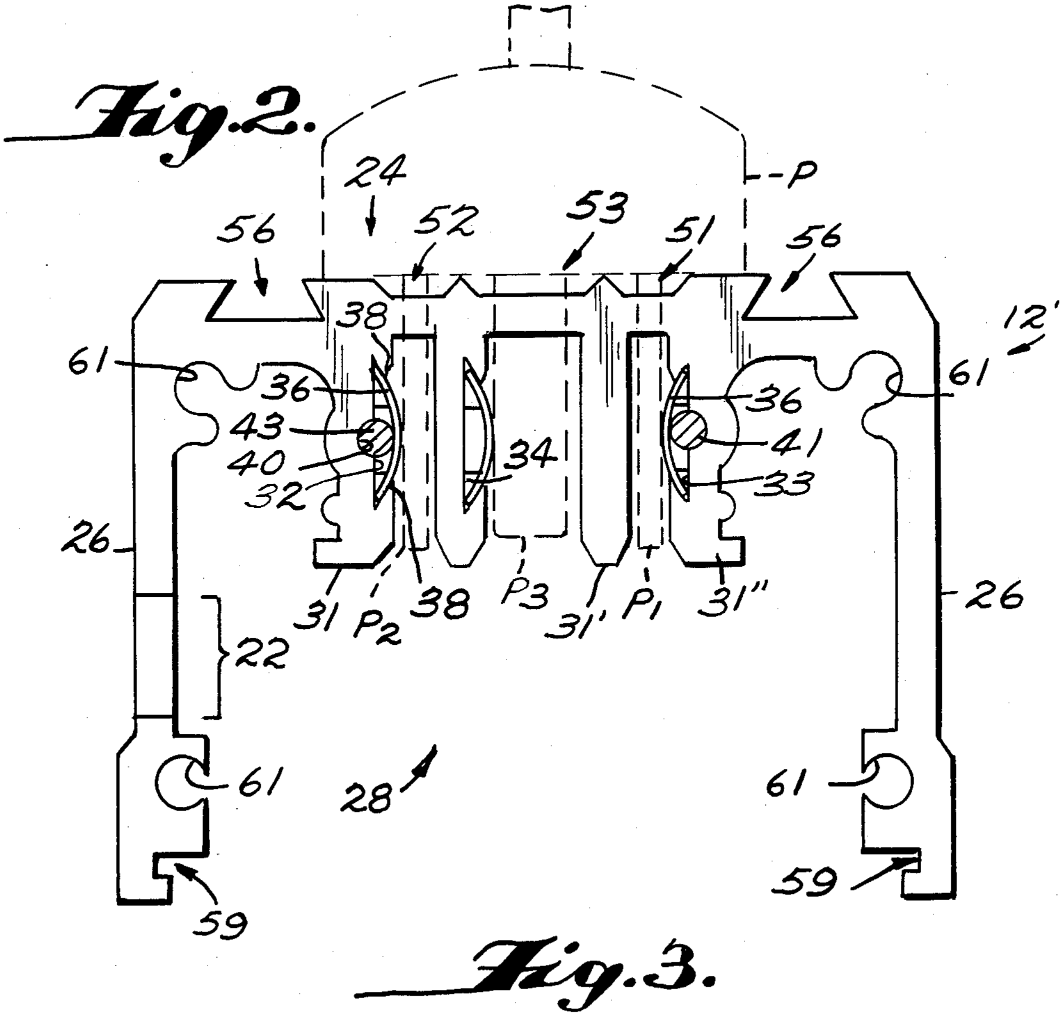
FIG. 2 is a side view, with end covers removed for clarity, illustrating a modified version of a multiple electrical outlet strip housing according to the invention.

The housing 12' illustrated in FIG. 2 differs from the housing 12 of FIG. 1 only in the height thereof. The housing 12' has an additional portion (compared to the housing 12) shown generally by reference numeral 22, providing a greater height for the housing 12'. The greater height of the housing 12' allows it to receive any desired electrical components such as circuit breakers, fuses, switches, or the like.

Figure 3:
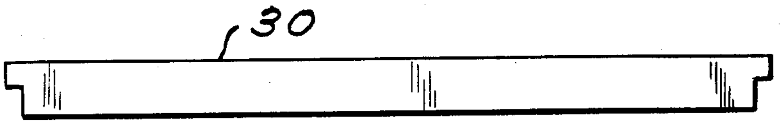
FIG. 3 is an end view of a bottom extrusion utilizable with the housing of FIG. 2.

The housing 12' is extruded from NORYL, LEXAN, ABS, high density pvc, or a like plastic, and includes at least a top surface 24, and side walls 26. While the housing 12' can be extruded with a bottom, in the embodiment illustrated in FIG. 2 it is extruded having a channel-shaped with an open bottom 28. A bottom member 30 (FIG. 3) is also extruded of electrical insulating material (e.g. rigid vinyl) to close off the open bottom 28 of the housing 12'.

The housing 12' is extruded in such a way that it allows for the ready receipt of electrical contact strips, ready mounting of the end plates 16, ready receipt of the bottom extrusion 30, and ready formation of the openings 14, and ready receipt of cover sections 20.

Elongated electrically conductive material-receiving interior channels 32, 33, and 34 are formed during the extrusion of the housing 12', preferably being formed in projections 31, 31', 31'', respectively, which extend interiorly from top 24 of housing 12'. The male electrical plug prong-receiving openings 14 formed in the top surface 24 of the housing 12' are adjacent these channels 32 through 34, so that when electrically conductive material strips 36 are inserted in the channels 32 through 34 plug prongs passing through openings 14 will positively engage the strips 36 (see FIG. 2). The channels 32 through 34 preferably are formed with tapered side walls, such as those illustrated by reference numeral 38 for channel 32, which assist in holding the strips 36 in place. During extrusion of the channels 32 through 34, preferably wire-receiving recesses 40, 41 are also formed therein for receipt of copper wires 43 or the like for ultimately electrically connecting the strips 36 to the cord 18 or the like.

The electrical contact strips 36, which are illustrated most clearly in FIGS. 2, 5, 6, and 7, are preferably formed of spring brass, in a roll form to provide a curved shape (see FIGS. 2 and 7) so that they present a spring surface to each of the prongs (P1–P3) from a male electrical plug. the strips 36 are cut to any length, corresponding to the length of the outlet strip 10. The length of the strips 36 is several inches shorter than that of the main housing 12' (see FIG. 8) so that there is room for inserting the wires 40 to make the end terminations, and so that there is electrical clearance between the strips 36 and the end plates 16, 16'. The strips 36 bridge all of the outlet openings 14, and are formed with tabs 45 for engagement with the wires 43, eliminating the need for solder connections. During shearing of the strips 36 to size, the tabs 45 are simulataneously formed, and locking portions 46 are simultaneously formed at the end of each strip 36 opposite the tab 45. The locking portions 46, in combination with the tapered side walls 38 of the channels 32 through 34, hold the strips 36 positively in place within each of the channels 32 through 34.

Figure 9:
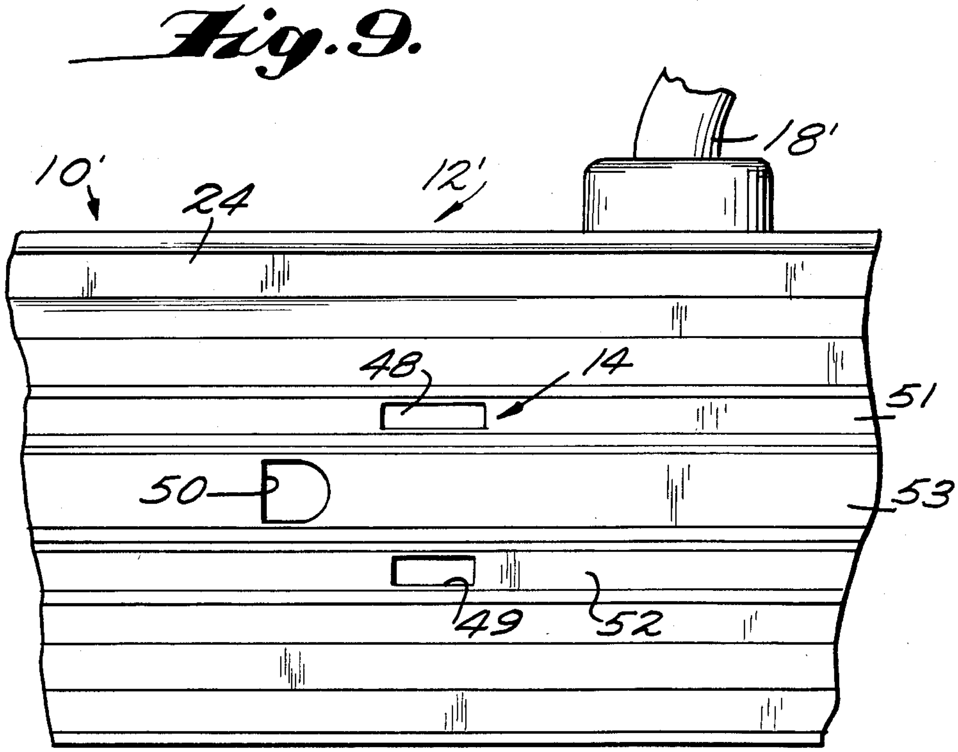
FIG. 9 is a top plan detail view of an exemplary multiple electrical outlet strip top surface, according to the present invention, illustrating the male plug prong-receiving openings formed therein.

The openings 14 formed in the housing top surface 24 can be punched during the extrusion process, or they could be punched at a secondary operation after the housing extrusion is cut to a predetermined housing length. Preferably, each set of openings 14 comprises three openings (see FIG. 9 in particular), openings 48 and 49 for the hot and neutral prongs of a male electrical plug, and opening 50 for the ground prong. The openings 48, 49, 50 are preferably disposed at the apeces of a triangle, as is conventional. During extrusion of the housing 12', grooves 51, 52, 53 are preferably extruded into the top surface 24 (see FIGS. 2 and 9) which grooves serve to guide the male plug prongs (P1–P3) into the openings 48 through 50.

In order to prevent dirt from entering the housing 12', or to close off unused outlets it is also desirable—according to the present invention—to provide cover portions 20. The cover portions 20 preferably are also extruded from plastic, such as rigid vinyl, and are cut so that they have a length 55 (see FIG. 1) great enough to cover one set of openings 14. During extrusions of the housing 12, 12', surface manifestations are extruded therein to cooperate with surface manifestations on the bottoms of the covers 20 to provide relative sliding engagement between the covers 20 and the housing 12, 12'. Typical such surface manifestations preferably comprise channels 56 (see FIG. 2) extruded in the top surface 24 of housing 12', with bosses 57 formed on the bottom surface of the covers 20 for sliding cooperation with the channels 56.

Figure 4:
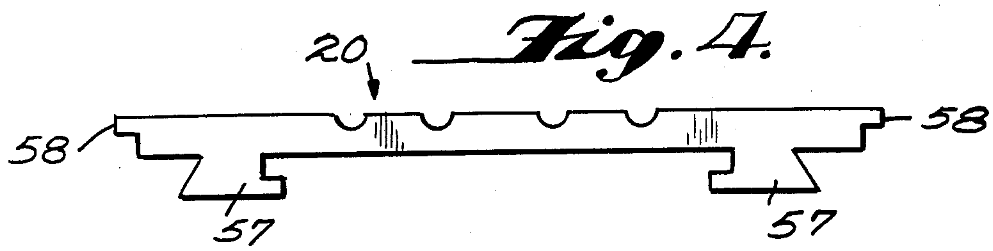
FIG. 4 is an end view of an extrusion comprising an outlet-opening cover, or housing bottom, utilization with the housing of FIG. 2.

In a preferred form according to the present invention, a single extrusion 20 may be utilized either for covering the bottom of housing 12', or for the cover plate. As illustrated in FIG. 4, such an extrusion would have bosses 57 extending from one surface thereof, and would have edge bosses 58 for cooperation with the bottom channels 59 formed in the housing extrusion 12'. In that way depending upon the length to which the extrusion was cut, and its orientation, it could serve as the bottom cover, or a top slide cover for one or more sets of openings 14.

In order to facilitate mounting of the end plates 16, 16' to the housing 12, 12', preferably a plurality of self-tapping screw-receiving channels 61 are formed in the interior of the housing 12'. The plates 16, 16' which preferably comprise metal (e.g. steel) stampings, or injection plastic moldings have openings formed therein aligned with the recesses 61. Self-tapping screws 63 pass through those openings into engagement with the recesses 61 to hold the end caps 16, 16' in place.

The end plates 16, 16' can have any number of openings stamped therein corresponding to structures which they are designed to receive. For instance the near end plate 16 illustrated in FIG. 1 has a central opening (unnumbered) stamped therein for passage of the electrical cord 18 therethrough. The end plate 16' illustrated in FIG. 8 has an opening (unnumbered) formed therein for receipt of circuit breaker 65, the circuit breaker having the actuator 66 thereof passing from the interior of the housing 12' through end plate 16' to the exterior of housing 12'. Also, the end plates 16, 16' preferably are formed with right-angle bent portions 68 on the bottoms thereof. The bent portions 68, in addition to preventing the bottom cover 30 from sliding out of engagement with the housing 12, 12', facilitate mounting of the multiple electrical outlet strip 10, 10' to a work surface. For instance openings 69 for receipt of screws (see FIG. 1) may be formed in the portions 68, or they may be formed with temporary mounting-type openings, such as illustrated in U.S. Pat. No. 4,072,401.

Figure 8:
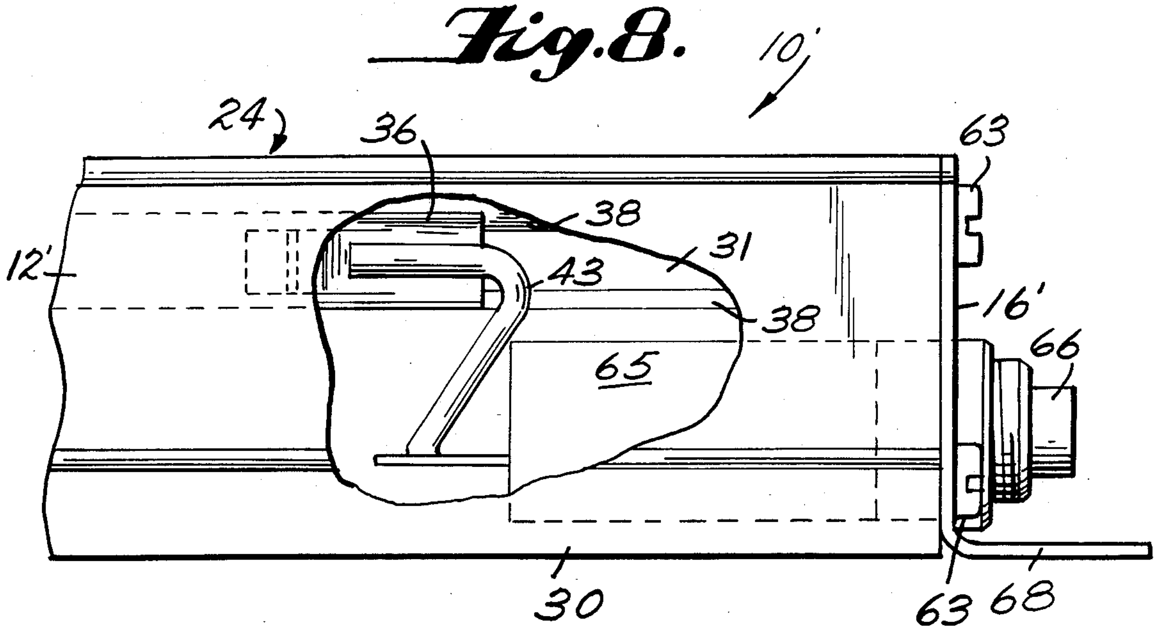
FIG. 8 is a detail side view of an assembled multiple electrical outlet strip utilizing the housing of FIG. 2, with portions cut away to illustrate interior components of the multiple electrical outlet strip.

In connecting the strips 36 to an electrical cord 18, or the like, extending exterior of the housing 12, 12', bare wire ends 40 can be moved into the recesses 41, 43 into contact with the strips 36 and tabs 45 thereof, as seen most clearly in FIGS. 2 and 8. The wire ends 40 may then pass directly to the cord 18 and exterior of the housing 12, or—as illustrated in FIG. 8—may be connected to other electrical components mounted within the housing 12'. For instance in FIG. 8 the housing 12' also includes the circuit breaker 65, the wires 43 being electrically connected to the circuit breaker 65, with wires from circuit breaker 65 ultimately passing to an electrical cord 18' (see FIG. 9) which may pass through one of the side walls 26 of the housing 12'. The ground contact strip 36 in channel 34 may have a recess formed therein (not illustrated in FIG. 2) corresponding to the recesses 40, 41, or it can be formed with an outwardly extending portion (not shown) which is then crimped to a wire 43.

An exemplary multiple electrical outlet strip according to the present invention having been described, an exemplary method of manufacture and manner of utilization thereof will now be set forth:

A housing 12' is extruded from NORYL LEXAN, ABS, high density pvc, or the like. It can be extruded with four sides, but in order to provide ready access to the interior for more easily mounting components, it is preferably extruded as a channel with an open-bottom 28. Electrical contact strip-receiving channels 32 through 34, with wire-receiving recesses 40, 41, are extruded in the interior thereof, as well as screw-receiving interior channels 61 and bottom receiving channels 59. In the top surface thereof cover-receiving channels 56 are extruded as well as upwardly opening guide channels 51 through 53.

A combination bottom cover or top cover (20) is also extruded, such as from rigid vinyl, and spaced sets of openings 14 for the passage of male electrical plug prongs (P1–P3) are punched in the top surface 24 of housing 12'.

The housing extrusion 12' is severed to provide a housing of predetermined length having opposite open ends. Electrically conductive material strips 36 are slid into each of the channels 32 through 34 so that they terminate short of the ends of the housing 12' but extend past all sets of openings 14. The strips 36 are maintained in the positions to which they have been moved by the side walls 38 of the channels 32 through 34, and by the locking portions 46 thereof. Copper wires 43 or the like are pushed into contact with strips 36 (and recesses 40, 41 etcetera), abutting tabs 45 thereof, and the wire 40 are subsequently connected to interior components (like circuit breaker 65) and/or to an electrical cord 18, 18' extending exteriorly of the housing 12'.

Extrusion 20 (30) is cut to be the same length as the housing 12', and edge bosses 58 thereof are slid into engagement with channels 59 of housing 12', covering the open bottom 28 of housing 12'. Then each of the end caps 16' is put in place, with self-tapping screw 63 passing through openings formed in each end cap 16' into engagement with the recesses 61, holding the end plates 16' in place. The cover extrusion 20 is cut to size to cover one set of openings 14, and any number are slid into covering engagement with any desired number of opening sets 14 with bosses 57 engaging channels 56.

To utilize the multiple electrical outlet strip 10, 10', the cord 18, 18' is merely plugged into an electrical outlet, or otherwise electrically interconnected with stationary building wiring. An electrical plug P (see FIG. 2) is then "plugged in" to the strip 10, 10' by passing the prongs P1, P2, P3 (see FIG. 2) thereof through openings 48, 49, 50 of one opening set 14 (the prongs P1 through P3 being guided into the openings by recesses 51 through 53). The prongs P1 through P3 make positive electrical contact with the spring contact strips 36 mounted in the channels 32 through 34, electricity thus passing from electrical cord 18, 18' through wires 43, through contact strips 36 to prongs P1 through P3.

It will thus be seen that according to the present invention a multiple electrical outlet strip may be simply and inexpensively formed. The tooling costs to produce outlet strips of varied length are minimal, and labor and component costs are low. Individual outlet covers are inexpensively provided to keep out dirt. Despite the inexpensiveness of construction, the multiple electrical outlet strip is mechanically and electrically superior to most conventional multiple electrical outlet strips having excellent electrical insulation properties, present a large contact area to each male electrical plug prong, and being positively connected to a power source.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims to encompass all equivalent methods and structures.

There is provision in the channel to assemble semi round flat type steel springs opposite each set of punched plug oppenings. This would give additional spring electrical contact pressure if necessary (see FIG. 2 marked in red).

What is claimed is:

1. A multiple electrical outlet strip comprising: a housing including a top surface, side walls, end walls, and bottom wall; means defining a plurality of through-extending openings in said housing top surface, at least two spaced sets of spaced openings for receipt of male electrical plug prongs being provided; means defining surface manifestations in said housing exterior for receipt of a cover plate for covering at least one set of openings in said housing top surface; and a cover plate means formed as a plastic extrusion and including surface manifestations formed thereon for slideable engagement with said housing surface manifestations, said cover plate means having a length sufficient to cover one set of electrical prong-receiving openings formed in said housing top surface.

2. A multiple electrical outlet strip comprising: a housing having an integral top surface and side walls of electrically insulating material; means defining at least two spaced sets of spaced openings for receipt of male electrical plug prongs in said housing top surface; means defining electrically conductive material-receiving interior channels in said housing adjacent said top surface openings; an elongated contact strip, having a length sufficient to bridge each of said sets of spaced openings in said housing top surface, disposed in each of said conductive material-receiving interior channels; and means for electrically interconnecting the electrical contact strips to an electrically conducting element which extends exteriorly of the housing; said housing having a channel-shape with an opening bottom; and means defining channels in said housing side walls (adjacent) adjacent said open bottom; and a bottom plate having edge-bosses corresponding in shape to said housing channels adjacent said open bottom, said bottom plate being of electrically insulating material and having the (edge bosses) edge-bosses thereof slideably engaging said housing channels adjacent said housing bottom; wherein said housing top surface includes means defining surface manifestations in the top surface thereof; and further comprising a cover plate having bosses extending from one surface thereof for engagement with said housing top surface manifestations for sliding engagement therewith; said cover plate having a length sufficient to cover one set of spaced openings formed in said housing top surface.

3. A multiplate electrical outlet strip comprising: a housing having an integral top surface and side walls of electrically insulating material; means defining at least two spaced sets of spaced openings for receipt of male electrical plug prongs in said housing top surface; means defining electrically conductive material-receiving interior channels in said housing adjacent said top surface openings; an elongated contact strip, having a length sufficient to bridge each of said sets of spaced openings in said housing top surface, disposed in each of said conductive material-receiving interior channels; and means for electrically interconnecting the electrical contact strips to an electrically conducting element which extends exteriorly of the housing;

wherein said housing top surface includes means defining surface manifestations in the top surface thereof; and further comprising a cover plate having bosses extending from one surface thereof for engagement with said housing top surface surface manifestations for sliding engagement therewith along the length of said housing top surface and perpendicular to the dimension of elongation of said openings; said cover plate having a length sufficient to cover one set of spaced openings formed in said housing top surface.

* * * * *